No. 885,600. PATENTED APR. 21, 1908.
N. GALLOWAY.
ANIMAL TRAP.
APPLICATION FILED SEPT. 27, 1906.
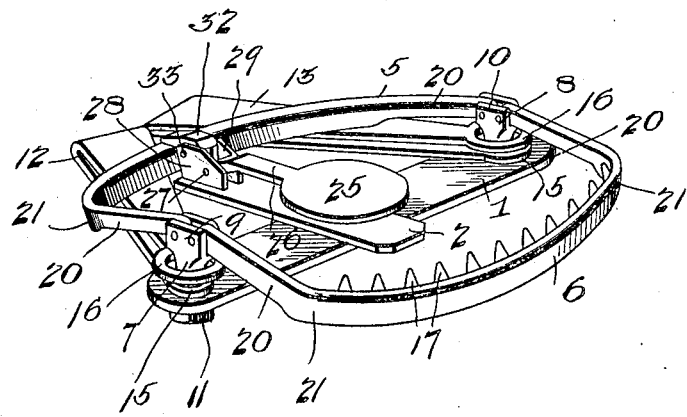
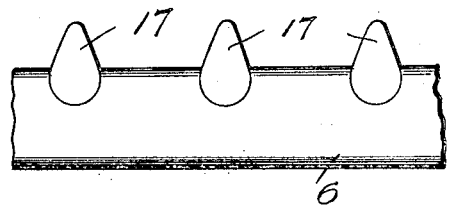
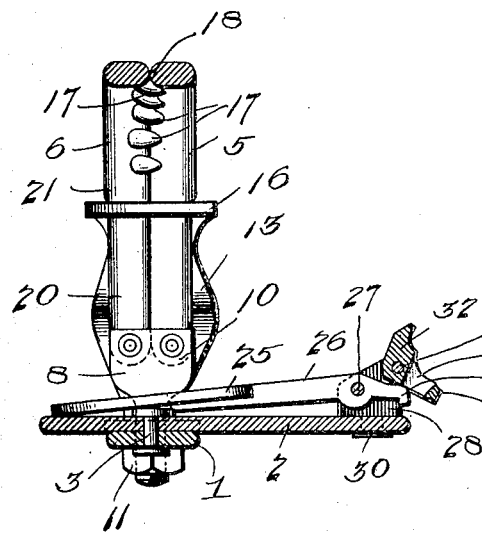
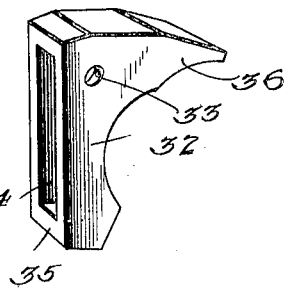
Inventor:
Nathan Galloway
By Joseph L. Atkins
Attorney

UNITED STATES PATENT OFFICE.

NATHAN GALLOWAY, OF VERNAL, UTAH.

ANIMAL-TRAP.

No. 885,600.   Specification of Letters Patent.   Patented April 21, 1908.

Application filed September 27, 1906. Serial No. 336,439.

*To all whom it may concern:*

Be it known that I, NATHAN GALLOWAY, of Vernal, in the county of Uinta, State of Utah, have invented certain new and useful Improvements in Animal-Traps, of which the following is a specification.

My invention, relating to the class of animal traps familiarly known as steel traps, or traps comprising a pair of spring actuated co-acting gripping jaws, has for its object the production of certain improvements therein whereby the general efficiency of the trap is improved and its capacity and holding power, in proportion to its dimensions, is increased.

What constitutes my invention will be hereinafter specified in detail and succinctly set forth in the appended claims.

In the accompanying drawings, which constitute a part of this specification, Figure I is a perspective view of my trap, set. Fig. II is a central vertical section of my trap, sprung, showing the pan and its shank in elevation. Fig. III is a bottom plan view of a section of the toothed jaw of my trap looking upwardly. Fig. IV is a perspective view of the trigger of my trap detached.

Referring to the numerals on the drawings, 1 indicates the bed-piece and 2 the cross bed-piece secured to the bed-piece 1, as by a rivet 3. The bed-piece and cross bed-piece constitute a base for my trap.

Upon the bed-piece 1, near its opposite ends, respectively, are pivotally mounted in such manner as to permit of their oscillating movement to and from each other, jaws 5 and 6. I prefer to mount them in standards 7 and 8 having slotted heads 9 and 10 for the reception of the jaws, respectively, and each secured to the bed-piece 1, through which they pass, as by a nut 11.

12 and 13 indicate the jaw-actuating springs, two being preferably employed. The springs are preferably of well known construction, each being a properly bent steel plate terminating in apertured ends 15 and 16. The aperture 15 of each spring fits the standard 7 or 8, to either of which it may be applied, between the bed-piece 1 and the head of the standard by which it is confined, securely but movably in place. The end 16 is in effect a loop, which, being of a diameter large enough to slip over the head of the standard by which the corresponding end 15 of the spring is confined, affords means to yieldingly actuate the jaws, against the sides of which the loop 16 rides to close the jaws together with a force corresponding to the combined power of the two springs.

The springs are in practice convergently disposed as to their bent ends, as shown in Fig. I of the drawings, in which position they not only afford a support for the trap in service, but also serve to actuate the two jaws at an unequal rate of speed, whereby the jaw 6 remote from the trigger, hereinafter specified, passes the vertical plane above the bed-piece 1 before meeting the jaw 5. Emphasis is laid upon the above mentioned unequal movement of the two jaws, because one of the features of my invention depends thereon. I refer to the employment of downwardly inclined teeth 17 arranged in a series upon the under side of the one jaw 6 only. The upper surface of each tooth 17, constructed as shown and above described, strikes underneath the jaw 5 when the jaws are closed, as indicated at 18 in Fig. II of the drawings. The unequal rate of speed in closure of the jaws above referred to renders the employment of the teeth 17, as specified, practicable by preventing the striking of the points of the teeth against the jaws when the jaws snap together. In the position specified, the teeth 17 may be spaced close enough together to hold a variety of animals, to catch which traps of different sizes have been heretofore deemed necessary. Located wholly underneath the jaws 5 and 6, the teeth 17 serve to hold the foot of an animal without such laceration as might facilitate its liberation from the trap. As contributing towards the same end, I make both jaws curvilinear in cross section, as shown in Fig. II, thereby avoiding the presence of any sharp edges against which an animal might cut away a leg or foot and free himself.

Each jaw is provided with parallel terminal portions 20 between which, from comparatively abrupt bends 21, the jaw is formed in the shape of a low browed arch. By this construction a substantially uniform distance between the jaws when closed and the bed-piece 1 from one side of the jaw to the other, is provided, which is a distinct advantage in the art, inasmuch as by such provision, the certainty of catching an animal, irrespective of the point at which his leg enters between the jaws, is equalized for the entire extent of the jaws.

25 indicates a pan and 26 a shank thereof, pivoted as by a pin 27, between cheek-plates 28 and 29, to the cross bed-piece 2 near its outer extremity. The cheek-plates are secured firmly and securely in place preferably by oblong rivet-pieces 30. The shank 26 terminates in a trigger finger 31, which terminates in comparative proximity to the cross bed-piece 2, whereby the movement of the pan is reduced to a minimum degree, thereby materially limiting the danger of breaking the trap in service.

A trigger 32 is pivoted, as indicated at 33, between the cheek-plates 28 and 29, and is provided with a finger-stall 34, provided on its lower side with a cross-piece 35 with which the finger engages when the trap is set and from which it is released as the trap is sprung through the pressure upon the pan 25. The trigger 32 is provided with an overhang 36, which engages the smooth jaw 5 of the trap when the trap is set and which confines the jaw in the open position shown in Fig. I so long as the finger 31 engages the cross-piece 35. When through pressure upon the pan 25 disengagement of the finger from the cross-piece is effected, the trigger turns upon its pivot 33 sufficiently to permit the jaw 5 to escape from the over-hang 36. In this connection, it should be observed that the trigger 32 is within the jaw 5 and that its movement with its over-hang 36 is inwardly and not outwardly. Moreover, the trigger is exceedingly compact in form and durable in construction. In practice the trigger 32 is quick acting, and having no outward movement eliminates the tendency that some traps have to throw the foot of an animal upwardly and clear the trap in releasing the trap jaw.

I employ the term trigger mechanism to designate those elements of my trap whose functions are to hold the jaws in set position and to release them from that position.

The operation of my trap will be understood from the reference thereto in the body of the foregoing specification.

What I claim is:

1. In an animal trap, the combination with a base, of jaws carried thereby, teeth upon the under side of one of said jaws, means for actuating the jaws at unequal speed, and a trigger mechanism.

2. In an animal trap, the combination with a base, of jaws carried thereby, teeth upon the under side of one of said jaws, convergently disposed springs whereby the jaws are actuated at unequal speed, and a trigger mechanism.

3. In an animal trap, the combination with a base, of jaws carried thereby, means for actuating the jaws, a pan provided with a shank movably mounted upon said base, and a slotted trigger adapted to engage one of said jaws and said shank.

4. In an animal trap, the combination with a base, of jaws carried thereby, means for actuating the jaws, a pan provided with a shank movably mounted upon said base and provided with a trigger-finger, a trigger adapted to engage one of said jaws and provided with a finger-stall having a cross-piece adapted to engage said trigger-finger.

5. In an animal trap, the combination with a base, of jaws carried thereby, means for actuating the jaws, a pan provided with a shank movably mounted upon said base, a trigger-finger carried by said shank, a slotted trigger, a cross-piece defining one end of said slot and adapted to engage said trigger finger, and an over-hang upon said trigger adapted to engage one of the jaws.

In testimony whereof I have hereunto signed my name in the presence of two subscribing witnesses.

NATHAN GALLOWAY.

Witnesses:
 HARDEN BENNION,
 JOSEPH H. HARDY.